United States Patent [19]
Hofmann

[11] Patent Number: 5,385,052
[45] Date of Patent: Jan. 31, 1995

[54] INERTIAL SENSOR
[75] Inventor: Fritz Hofmann, Munich, Germany
[73] Assignee: Deutsche Aerospace AG, Germany
[21] Appl. No.: 962,727
[22] Filed: Oct. 19, 1992
[30] Foreign Application Priority Data
 Oct. 17, 1991 [DE] Germany .................. 4134311
[51] Int. Cl.⁶ .................................. G01P 15/08
[52] U.S. Cl. ........................................ 73/517 A
[58] Field of Search ................. 73/517 A, 517 R
[56] References Cited
U.S. PATENT DOCUMENTS

| 2,753,475 | 7/1956 | Curl | 73/517 A |
| 2,912,657 | 11/1959 | Schaevitz | 73/517 A |
| 4,984,463 | 1/1991 | Idogaki | 73/517 A |
| 5,025,663 | 6/1991 | Smith | 73/517 A |

Primary Examiner—Tom Noland
Assistant Examiner—Christine K. Oda
Attorney, Agent, or Firm—Evenson, McKeown, Edwards & Lenahan

[57] ABSTRACT

An inertial sensor for measuring changes in rotational motion of a sensor support, having a flywheel rotationally movable in the plane of rotational motion relative to the sensor support and a measured value sensor picking up the rotational state of the flywheel relative to the sensor support. A torque coupler is provided between the sensor support and flywheel. The torque coupler has a torque curve that is a linear function of the relative angular velocity between the flywheel and the sensor support. The measured value sensor is designed as an angular position detector that taps off the rotational angle of the flywheel relative to the sensor support.

16 Claims, 2 Drawing Sheets

INERTIAL SENSOR

BACKGROUND AND SUMMARY OF THE INVENTION

The invention relates to an inertial sensor for measuring transient changes in rotational motion.

Rotational acceleration sensors or velocity sensors that determine the rotational motion of a sensor support by measuring the relative rotation of an inertial mass movable relative to the sensor support are known in numerous embodiments. These include simple centrifugal sensors, electromechanical accelerometers with mercury reaction masses and electrically powered gyroscopes. However, these known sensor systems are frequently very expensive from the mechanical and electronic standpoints and are prone to wear. In particular, they are unable to detect with sufficient accuracy those transient rotational states in which the angular velocity of the sensor support briefly reaches high peak values.

A typical application for such sensors is the acquisition of measurement data from motor vehicle accidents in which rotational accelerations on the order of 10,000°/sec$^2$ and rotational velocities as high as 1,000°/sec are reached, and the rotational angle traversed must be determined with a high degree of accuracy for accident analysis. Such accuracy, however, is not possible with the known inertial systems, either because their measurement ranges are too low or because interfering measurement signal overshoots occur.

The goal of the present invention is to provide an inertial sensor of the type recited above which ensures an exact determination of transients, especially of extremely short changes in the rotational state of the sensor support, despite mechanically and electronically simple low-wear design.

The goal is achieved by the inertial sensor according to the invention, which operates on the basis of a simple transfer function free of nonlinearities, and consists of a few easily manufactured and assembled elements. The linear damping characteristic provided by the torque coupler according to the invention, produces effective stabilization of the measurement results relative to disturbing influences caused by torsional vibration and overshoot effect, even with brief, very high angular accelerations of the sensor support. This makes it possible to determine unambiguously from the relative angular displacement between the flywheel and the sensor housing, the change in rotation undergone by the sensor support in inertial space (in particular the size of the rotational angle traversed) and with very low computing effort, with the peripheral electronics required for signal processing and evaluation likewise being considerably simplified.

For further structural simplification, the torque coupler between the flywheel and sensor support is advantageously designed as an induction brake with a torque characteristic that is a linear function of the angular velocity. In an especially preferred embodiment the torque coupler is designed as an eddy current brake with a permanent magnet integral with the flywheel and magnetic yoke integral with the sensor support, and is provided with an annular sleeve as a conducting layer.

The coasting of the flywheel relative to the sensor support results from the changes in rotation of the sensor support, and the linear damping characteristic. It is advantageous to improve the measurement stability and accuracy by a selection of a time constant, which is determined by the inertial mass of the flywheel and the steepness of the linear torque curve, several times greater than the duration of the rotational changes of the sensor support.

The rotational angle traversed by the sensor support during the change in rotation can be determined very simply and without costly integration, from the measurement signals of the angular position detector on the basis of the linear transfer function of the inertial sensor.

For further structural simplification and cost savings, in another embodiment of the invention, the evaluation circuit constitutes a module separate from the other sensor components, and the measurement signals from the angular position detector are stored for later signal evaluation in temporary storage, resulting in substantial space-saving and an inexpensive design, especially for application to motor vehicle accident analysis as mentioned at the outset.

Other objects, advantages and novel features of the present invention will become apparent from the following detailed description of the invention when considered in conjunction with the accompanying drawings.

DETAILED DESCRIPTION OF THE DRAWINGS

Figure 1:
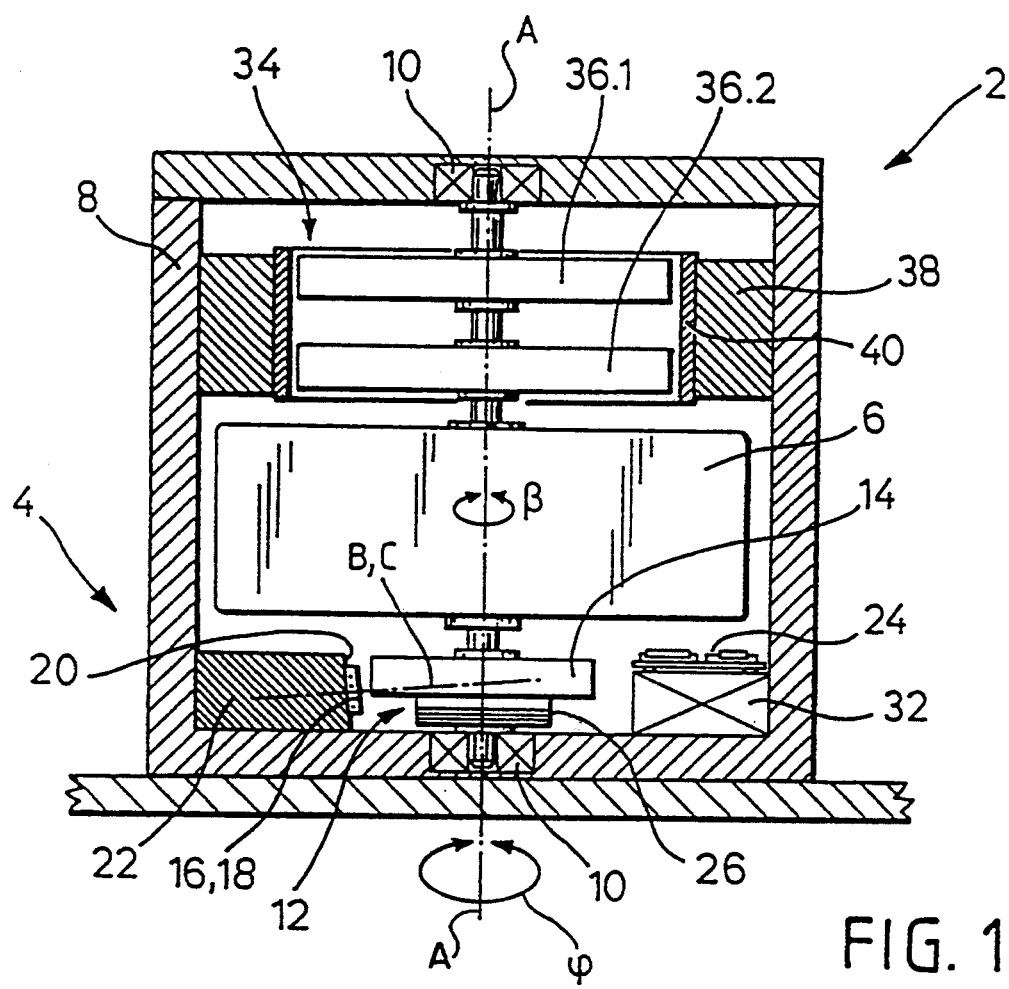
FIG. 1 is a partially cut-away view of an inertial sensor according to the invention.

The inertial sensor 2 shown in the figure measures sudden changes in rotational movements of a sensor support 4 in a plane perpendicular to sensor axis A. The sensor contains a flywheel 6 mounted in housing 8 of sensor support 4, sealed off from the outside, on low-friction bearings 10 and completely free to rotate around sensor axis A.

Rotational angle $\beta$ of flywheel 6 relative to sensor support 4 is tapped off by the angular position detector, represented as a whole by 12. This angular position detector consists of a permanent magnet element 14 integral with the flywheel, whose magnetic N-S axis runs perpendicular to sensor axis A, as well two magnetic field sensing elements 16, 18 mounted on a flat mounting surface 20 of a retaining rib 22 made integral with the housing, for example by gluing. Measuring axes B, C of sensing elements 16, 18 run parallel to one another, each at a distance e (see FIG. 2) eccentrically with respect to sensor axis A.

The rotational position of magnetic element 14 is determined with a high degree of accuracy from the two measurement signals of sensing elements 16, 18, which vary sinusoidally as a function of rotational angle $\beta$, and are displaced by a phase-angle distance of 90°, but otherwise identical. Deviations from the required signal curve resulting from manufacturing and assembly tolerances, with the exception of the phase-angle scatters, are compensated by a resistance network 24.

Manufacturing-related deviations from the required phase-angle distance, on the other hand, are corrected by height adjustment of magnetic element 14 in the direction of sensor axis A, most simply by using spacers 26 of different thicknesses.

In order for the adjustment sensitivity of the angular position detector 12, (that is, the ratio of the resultant change in phase spacing to the displacement travel of magnetic element 14), to not be too great in view of the high degree of miniaturization of inertial sensor 2, mounting surface 20 is inclined in the manner shown in FIG. 1 relative to sensor axis A. In other words, measuring axes B and C each lie in a plane inclined to sensor axis A, the planes intersecting sensor axis A below the central plane of magnetic element 14.

Figure 2:
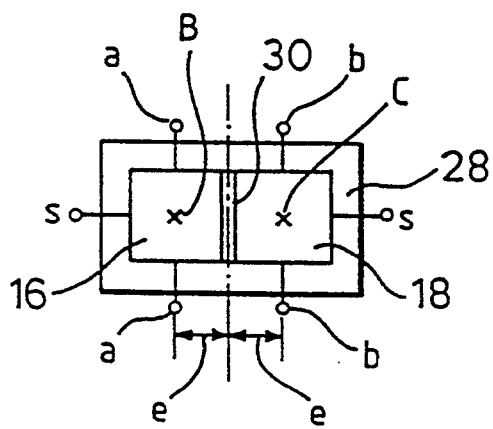
FIG. 2 is a view of a portion of the angular position detector in the area of the magnetic field sensing elements.

According to FIG. 2, the two sensing element 16 and 18 are made in the form of Hall effect elements in a tandem design. For this purpose, initially only a single cohesive semiconductor layer is applied to a substrate 28, and is then divided centrally by a transverse conducting layer 30 into two partial zones of the same size, each forming a Hall effect element 16 or 18. Hall effect elements 16 and 18 are connected in series to provide the control current supply between terminals s, while the measuring voltages are tapped off at connecting electrodes a and b respectively, corrected in resistance and amplifier network 24 located downstream, and then stored in intermediate storage 32 as sine $\beta$ or cosine $\beta$ values. Moreover, the angular position detector itself is the subject of German Patent Applications P 4 113 880 and P 4 125 482.

Figure 3:
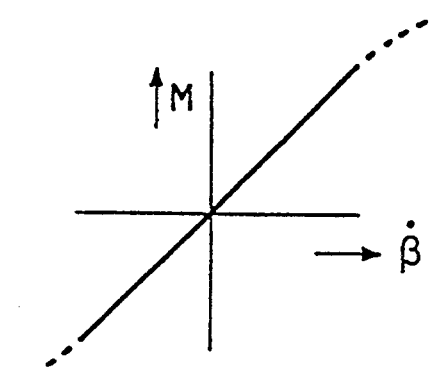
FIG. 3 shows the shape of the torque curve of the eddy current brake as a function of the relative velocity of the flywheel and sensor support.

Rotational changes in the orientation of sensor support 4 in inertial space (that is, changes in the angle $\Psi$ according to FIG. 1) are transferred to flywheel 6 through a torque coupler 34. Designed as an eddy-current brake, the torque coupler consists of two flat cylindrical radially magnetized permanent magnet disks 36.1 and 36.2 which are connected at a distance from one another permanently to flywheel 6, and are rotatable in conjunction with the flywheel around sensor axis A, as well as an annular magnetic yoke 38 integral with the support and provided on its inner annular surface with a conducting layer in the form of a copper sleeve 40 concentrically surrounding magnetic disks 36. It is functionally important that eddy current brake 34 possess a linear torque curve, that is, the magnetic air gap between magnetic disks 36 and magnetic yoke 38, in view of the coercive force of permanent magnet 36, must be made large enough that transferred braking torque M in the working range changes in proportion to the angular velocity $\beta^\bullet$ of the flywheel 6 relative to sensor support 4, as illustrated by the torque curve shown in FIG. 3. Instead of two radially magnetized disks, a single magnetic disk magnetized laterally sectorwise can be used.

The inertial sensor 2 described above has a linear transfer function according to the following equation:

$$\Delta\beta = \Delta\Psi \times \frac{T_d * s}{(T_d * s + 1)}$$

where
$\Delta\Psi$ = change in angle of rotation of sensor support 4 in inertial space;
T = damping time constant;
s = Laplace differential operator, and
$\Delta\beta$ = change in angle of flywheel 6 relative to sensor support 4.

Damping time constant $T_d$ is determined from the inertial mass of flywheel 6 and the steepness of the linear torque curve of eddy-current brake 34. It is chosen so that flywheel 6 has a relatively long coasting time relative to a brief change in rotation of sensor support 4.

Figure 4:
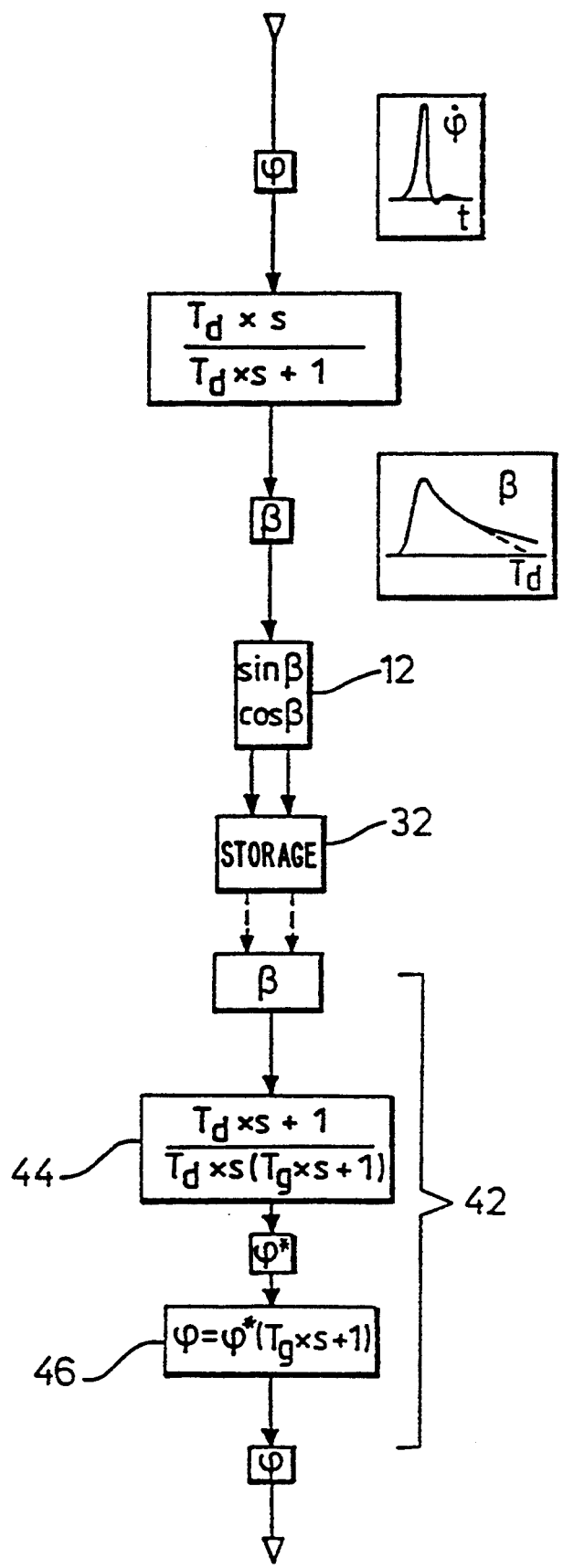
FIG. 4 is a diagram of signal flow in the inertial sensor and the corresponding evaluation circuit.

FIG. 4 shows the signal flow in inertial sensor 2. A transient change in sensor support rotational angle $\Psi$, in which the angular velocity ($\Psi^\bullet$) briefly reaches a high peak value, results in a change in the relative angle of rotation $\beta$ of flywheel 6 relative to sensor support 4, according to the transfer function given above. The corresponding sine and cosine values are tapped off from angular position detector 12 and stored in temporary storage 32, from which they are called up for further signal processing in an evaluation circuit 42. From the sine and cosine values called up, evaluation circuit 42 first computes relative angle $\beta$, from which rotational angle $\Psi$ of support 4 to be measured is determined, based on the inverse function, in an evaluation filter 44 with smoothing characteristic Tg and a downstream correction stage 46.

Such later signal processing in an evaluation circuit 42 separate from the inertial sensor is not essential to the invention, but the output signals of angular position detector 12, eliminating intermediate storage 32, could also be supplied instead to an evaluation circuit 42 located immediately downstream.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An inertial sensor for measuring rapid changes in rotational motion in a rotational plane, comprising:
    a sensor support subjected to the rotational motion;
    a flywheel adapted to rotate relative to said sensor support in the rotational plane;
    torque coupling means for torque transmission between said sensor support and said flywheel;
    angular position detecting means for sensing a rotational displacement of the flywheel relative to said sensor support and providing output signals; and
    signal processing means for determining said changes in rotational motion in dependence on said output signals of the detecting means;
    wherein said torque coupling means has a torque transmitting characteristic which is linearly proportional to a relative angular velocity of the flywheel and the sensor support so as to provide the inertial sensor with a linear rotational angle transfer function.

2. The inertial sensor according to claim 1, wherein the torque coupling means comprises an induction brake.

3. The sensor according to claim 2, wherein said signal processing means determines the rotational angle traversed by said sensor support during a change in said rotational motion, from said output signals of said angular position detecting means as a function of said linear rotational angle transfer function.

4. The inertial sensor according to claim 1, wherein said signal processing means determines the rotational angle traversed by said sensor support during a change in said rotational motion, from said output signals of said angular position detecting means as a function of said linear rotational angle transfer function.

5. The inertial sensor according to claim 4, wherein the signal processing means comprises a module separate from the sensor, and wherein the angular position detecting means is associated with an intermediate storage device that records the output signals for later call up to the signal processing means.

6. The inertial sensor according to claim 4, wherein the angular position detecting means comprises a permanent magnetic element completely free to rotate jointly with the flywheel, with a magnetic field directed perpendicularly to a rotational axis of said inertial sensor, and two magnetic field sensing elements staggered with respect to one another in a circumferential direction of the rotational axis, said magnetic element and said field sensing elements having a measuring axes parallel to one another and each of said elements having an eccentric spacing from the rotational axis.

7. An inertial sensor for measuring rapid changes in rotational motion in a rotational plane, comprising:
   a sensor support subjected to the rotational motion;
   a flywheel adapted to rotate relative to said sensor support in the rotational plane;
   torque coupling means for torque transmission between said sensor support and said flywheel;
   angular position detecting means for sensing a rotational displacement of the flywheel relative to said sensor support and providing output signals; and
   signal processing means for determining said changes in rotational motion in dependence on said output signals of the detecting means;
   wherein said torque coupling means has a torque transmitting characteristic which is linearly proportional to a relative angular velocity of the flywheel and the sensor support so as to provide the inertial sensor with a linear rotational angle transfer function;
   wherein the torque coupling means comprises an induction brake; and
   wherein the induction brake comprises an eddy-current brake having a permanent magnet, said magnet being integral with the flywheel, and a magnetic yoke which is integral with the support and has on an inner surface thereof facing the permanent magnet an annular closed conducting layer.

8. The inertial sensor according to claim 7, wherein a time constant of a rotational angle transfer function of the inertial sensor, dependent on an inertial mass of the flywheel and the steepness of the linear torque curve, is much greater than the duration of said changes in rotational motion of said sensor support.

9. The inertial sensor according to claim 7, wherein said signal processing means determines the rotational angle traversed by said sensor support during a change in said rotational orientation, from said output signals of said angular position detecting means as a function of said linear rotational angle transfer function.

10. The inertial sensor according to claim 7, wherein the angular position detecting means comprises a permanent magnetic element completely free to rotate jointly with the flywheel, with a magnetic field directed perpendicularly to a rotational axis of said inertial sensor, and two magnetic field sensing elements staggered with respect to one another in a circumferential direction of the rotational axis, said magnetic element and said field sensing elements having a measuring axes parallel to one another and each of said elements having an eccentric spacing from the rotational axis.

11. The inertial sensor according to claim 10, wherein said field sensing elements are formed from a single semiconductor layer, said layer being divided by a conducting layer into two adjacent partial zones each forming a sensing element.

12. An inertial sensor for measuring rapid changes in rotational motion in a rotational plane, comprising:
   a sensor support subjected to the rotational motion;
   a flywheel adapted to rotate relative to said sensor support in the rotational plane;
   torque coupling means for torque transmission between said sensor support and said flywheel;
   angular position detecting means for sensing a rotational displacement of the flywheel relative to said sensor support and providing output signals;
   signal processing means for determining said changes in rotational motion in dependence on said output signals of the detecting means;
   wherein said torque coupling means has a torque transmitting characteristic which is linearly proportional to a relative angular velocity of the flywheel and the sensor support so as to provide the inertial sensor with a linear rotational angle transfer function; and
   wherein a time constant of a rotational angle transfer function of the inertial sensor, dependent on an inertial mass of the flywheel and the steepness of the linear torque curve, is much greater than the duration of said changes in rotational motion of said sensor support.

13. An inertial sensor for measuring rapid changes in rotational motion in a rotational plane, comprising:
   a sensor support subjected to the rotational motion;
   a flywheel adapted to rotate relative to said sensor support in the rotational plane;
   torque coupling means for torque transmission between said sensor support and said flywheel;
   angular position detecting means for sensing a rotational displacement of the flywheel relative to said sensor support and providing output signals; and
   signal processing means for determining said changes in rotational motion in dependence on said output signals of the detecting means;
   wherein said torque coupling means has a torque transmitting characteristic which is linearly proportional to a relative angular velocity of the flywheel and the sensor support so as to provide the inertial sensor with a linear rotational angle transfer function; and
   wherein the angular position detecting means comprises a permanent magnetic element completely free to rotate jointly with the flywheel, with a magnetic field directed perpendicularly to a rotational axis of said inertial sensor, and two magnetic field sensing elements staggered with respect to one another in a circumferential direction of the rotational axis, said magnetic element and said field sensing elements having a measuring axes parallel to one another and each of said elements having an eccentric spacing from the rotational axis.

14. The inertial sensor according to claim 13, wherein the magnetic field sensing elements are mounted on a common flat mounting surface of sensor support, and said magnetic element for adjusting the phase-angle spacing of the angular position detecting means is movably height-adjustable in the direction of the rotational axis relative to the sensing elements.

15. The inertial sensor according to claim 14, wherein said mounting surface is inclined at an angle relative to the rotational axis.

16. The inertial sensor according to claim 13, wherein said field sensing elements are formed from a single semiconductor layer, said layer being divided by a conducting layer into two adjacent partial zones each forming a sensing element.

* * * * *